US011864709B2

(12) United States Patent
Lee

(10) Patent No.: US 11,864,709 B2
(45) Date of Patent: Jan. 9, 2024

(54) DISHWASHER

(71) Applicant: LG Electronics Inc., Seoul (KR)

(72) Inventor: Sangik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 17/379,226

(22) Filed: Jul. 19, 2021

(65) Prior Publication Data

US 2021/0345852 A1 Nov. 11, 2021

Related U.S. Application Data

(63) Continuation of application No. 16/474,413, filed as application No. PCT/KR2017/015521 on Dec. 27, 2017, now Pat. No. 11,076,741.

(30) Foreign Application Priority Data

Dec. 27, 2016 (KR) ........................ 10-2016-0180227

(51) Int. Cl.

| | |
|---|---|
| ***A47L 15/00*** | (2006.01) |
| ***A47L 15/08*** | (2006.01) |
| ***A47L 15/10*** | (2006.01) |
| ***A47L 15/23*** | (2006.01) |
| ***A47L 15/42*** | (2006.01) |
| ***B01F 23/20*** | (2022.01) |
| ***B01F 23/213*** | (2022.01) |

(52) U.S. Cl.

CPC ........... *A47L 15/10* (2013.01); *A47L 15/0015* (2013.01); *A47L 15/08* (2013.01); *A47L 15/23* (2013.01); *A47L 15/4214* (2013.01); *A47L 15/4219* (2013.01); *A47L 15/4278* (2013.01); *B01F 23/20* (2022.01); *A47L 2601/03* (2013.01); *B01F 23/21311* (2022.01)

(58) Field of Classification Search

None

See application file for complete search history.

(56) References Cited

U.S. PATENT DOCUMENTS

2014/0069469 A1 3/2014 Choi et al.

FOREIGN PATENT DOCUMENTS

| | | |
|---|---|---|
| CN | 1061522 | 6/1992 |
| JP | 2002186840 | 7/2002 |
| JP | 2010007315 | 1/2010 |

(Continued)

OTHER PUBLICATIONS

Extended European Search Report in European Application No. 17888636.2, dated May 26, 2020, 9 pages.

(Continued)

*Primary Examiner* — Levon J Shahinian

(74) *Attorney, Agent, or Firm* — Fish & Richardson P.C.

(57) ABSTRACT

The present invention relates to a dishwasher. The dishwasher according to the present invention includes a tub for providing a washing space, a rack for accommodating dishes in the tub, a spray nozzle for spraying wash water toward the dishes accommodated in the rack, a sump for supplying the wash water to the spray nozzle, a pump for pumping the wash water stored in the sump to the spray nozzle, a supply pipe connecting the sump and the spray nozzle, and an air jet generator disposed in a supply flow path formed by the supply pipe to suck outside air to the wash water flowing along the supply pipe and crush the air to thereby form air bubbles.

20 Claims, 8 Drawing Sheets

(56) References Cited

FOREIGN PATENT DOCUMENTS

| | | |
|---|---|---|
| JP | 2014147901 | 8/2014 |
| JP | 2014168760 | 9/2014 |
| JP | 2016129634 | 7/2016 |
| KR | 10798994 | 1/2008 |
| KR | 1020140033895 | 3/2014 |
| KR | 1020160116878 | 10/2016 |

OTHER PUBLICATIONS

PCT International Search Report in International Application No. PCT/KR2017/015521, dated Apr. 18, 2018, 7 pages (with English translation).

DISHWASHER

TECHNICAL FIELD

The present invention relates to a dishwasher, and more particularly to a dishwasher that forms air bubbles in a supply flow path to spray the air bubbles to a spray nozzle.

BACKGROUND ART

In general, a dishwasher is a home appliance that removes food residue remaining on dishes by wash water sprayed from a spray nozzle with high pressure.

A conventional dishwasher includes a tub having a washing space formed therein, and a sump mounted to a bottom surface of the tub to store wash water.

Here, the wash water flows to the spray nozzle by a pumping operation of a wash pump mounted in the sump, and the wash water flown to the spray nozzle is sprayed with high pressure through a spray port formed at an end of the spray nozzle. As the wash water sprayed with the high pressure hits surfaces of dishes, foreign matters such as food residue remaining on the dishes fall to a bottom of the tub.

In addition, a filter is disposed between the sump and the tub, and the filter filters out foreign matters contained in the wash water.

In order to remove contaminants from dishes, the dishwasher utilizes a mechanical force achieved by spraying wash water through a nozzle inside the dishwasher, and a detergent's ability of removing contaminants with chemical reaction between the detergent and the contaminants.

Korean Patent Application Publication No. 10-2013-0071355 discloses that an additional an electrolysis unit is provided to generate minute bubbles of gas to enhance washing performance, but there are problems that the additional electrolysis unit is required and that an electrolysis device is required to operate separately from a pump.

RELATED ART DOCUMENT

Patent Document

Korean Patent Application Publication No. 10-2013-0071355

DISCLOSURE

Technical Problem

An object of the present invention is to provide a dishwasher that sprays wash water containing air bubbles through a spray nozzle.

Another object of the present invention is to provide a dishwasher that generates air bubbles in wash water being supplied from a sump to a spray nozzle.

Technical Solution

In order to achieve the aforementioned objects, the present invention provides a dishwasher including a tub for providing a washing space, a rack for accommodating dishes in the tub, a spray nozzle for spraying wash water toward the dishes accommodated in the rack, a sump for supplying the wash water to the spray nozzle, a pump for pumping the wash water stored in the sump to the spray nozzle, a supply pipe connecting the sump and the spray nozzle, and an air jet generator disposed in a supply flow path formed by the supply pipe to suck outside air to the wash water flowing along the supply pipe and crush the air to thereby form air bubbles.

The air jet generator may include an impeller applying a centrifugal force to flowing wash water, a decompression portion for reducing pressure of the flowing wash water, an air suction portion opened to allow air to flow into the decompression portion, a pressing portion for increasing pressure so as to crush the air introduced from the air suction portion, and an air tap having a plurality of holes so as to crush the air contained in the wash water having passed the pressing portion, and accordingly, outside air is suctioned using a negative pressure into wash water flowing through the supply pipe by the pump and the outside air is crushed to generate minute air bubbles.

The supply pipe may include a deformed connection portion of which a cross section of a flow path is deformed into a shape identical to a cross section of a flow path of the air jet generator at a portion connected to the air jet generator, and a plurality of guide vanes may be installed in a length direction within the deformed connection portion, and accordingly, the wash water may be allowed to flow uniformly even though a shape of the pipe along which the wash water flows is deformed.

Advantageous Effects

First, the dishwasher according to the present invention sprays wash water containing air bubbles through a spray nozzle, thereby enhancing washing performance of the dishwasher.

Second, the dishwasher according to the present invention does not require an additional pump or the like to form air bubbles and instead is capable of forming air bubbles simply with installation of an air jet generator on an existing supply path, thereby requiring less resources.

Third, the dishwasher according to the present invention is capable of allowing wash water to uniformly flow through guide vanes and the like in spite of deformation of a cross-sectional flow area of the supply path, and therefore, air bubbles may be generated stably.

BEST MODE

Hereinafter, a dishwasher 10 according to embodiments of the present invention will be described with reference to the accompanying drawings.

Figure 1:
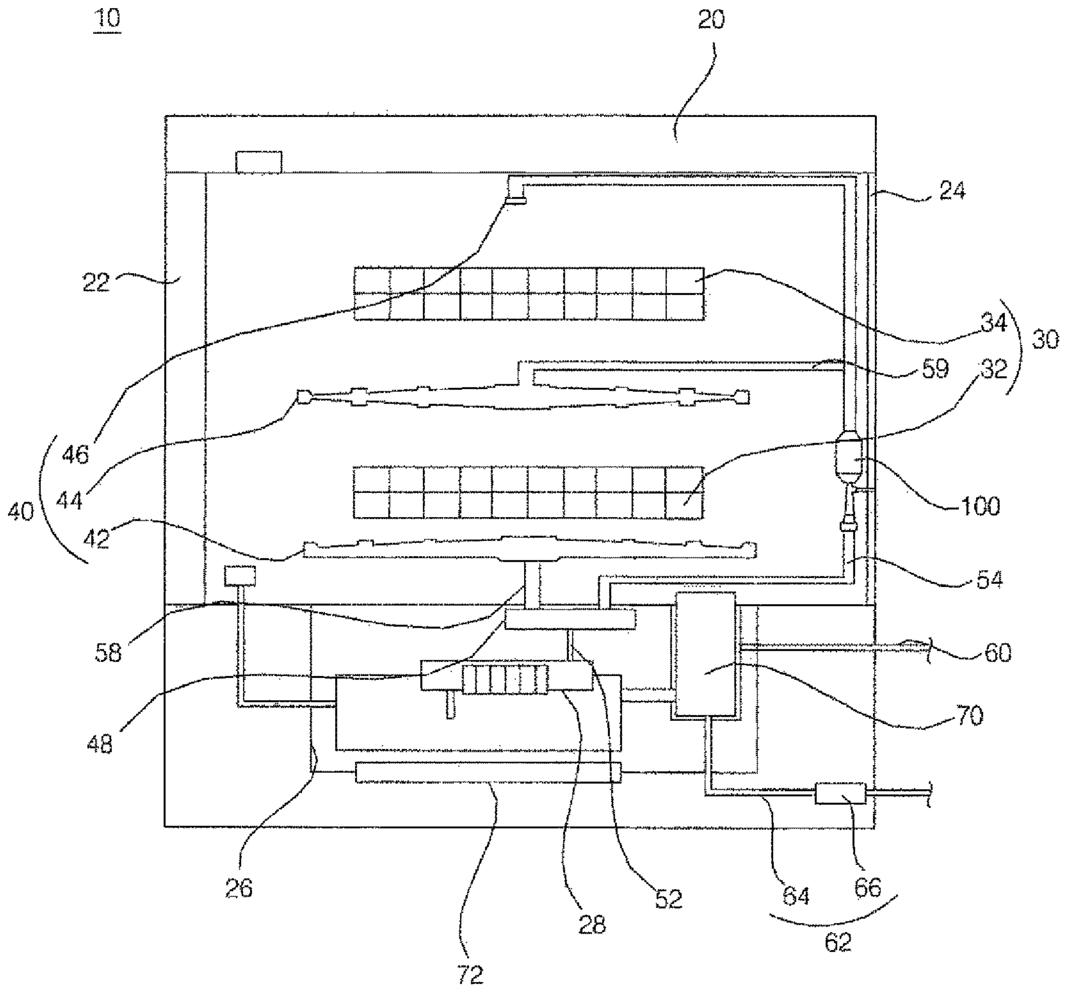
FIG. 1 is a schematic front view of a dishwasher according to an embodiment of the present invention.
Figure 2:
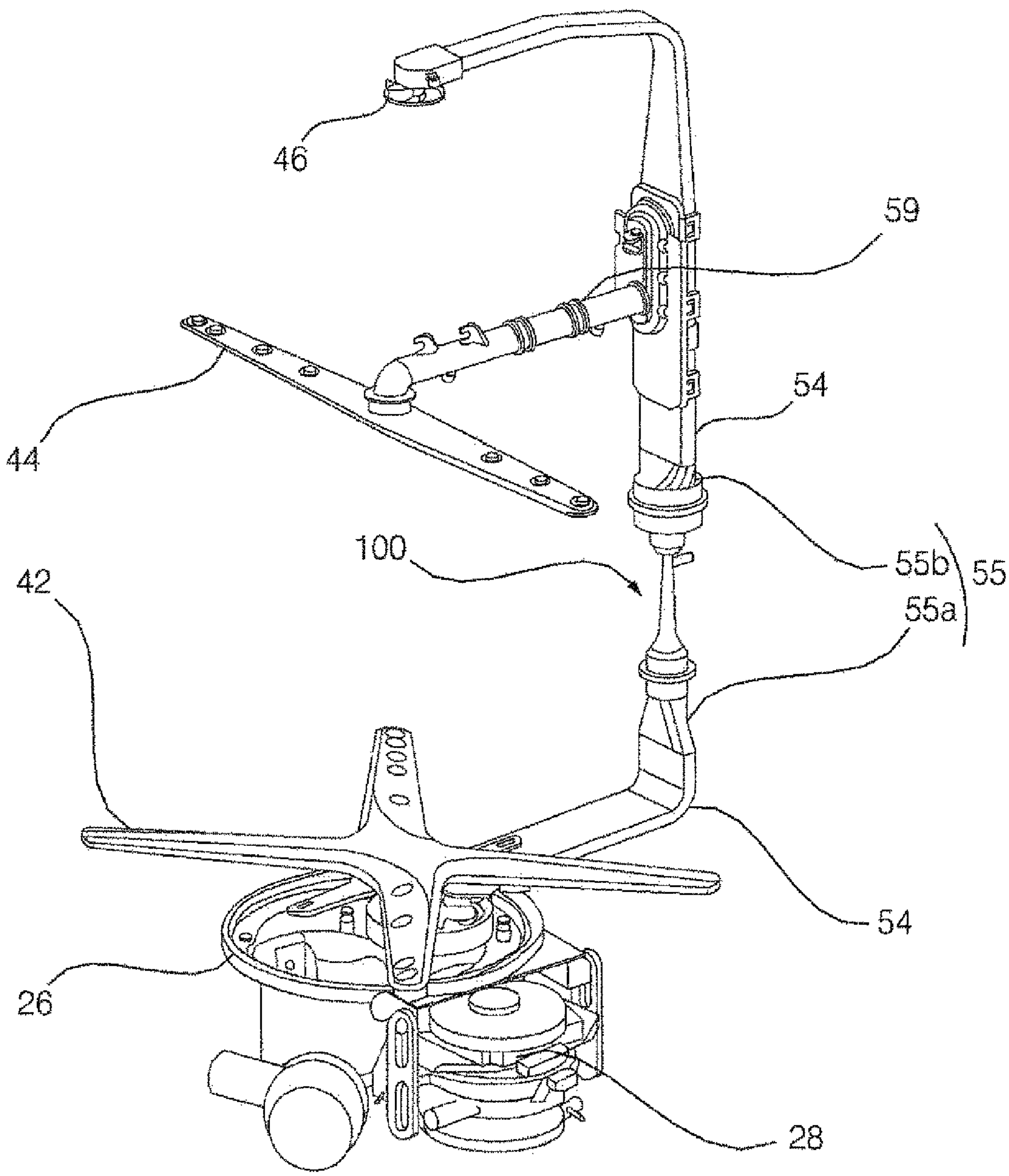
FIG. 2 is a view illustrating a supply pipe, in which an air jet generator is installed, a supply nozzle according to an embodiment of the present invention.

FIG. 1 is a schematic front view of a dishwasher according to an embodiment of the present invention. FIG. 2 is a view illustrating a supply pipe, in which an air jet generator is installed, a supply nozzle according to an embodiment of the present invention.

Referring to FIG. 1, the dishwasher 10 according to the present embodiment includes a cabinet 20 forming an exterior appearance, a door 22 coupled to the cabinet 20 to open and close the interior of the cabinet 20, and a tub 24 installed in the cabinet 20, into which wash water or steam is applied.

The dishwasher 10 according to the present embodiment may include: a rack 30 for accommodating dishes within the tub 24, a spray nozzle 40 for spraying wash water toward the dishes accommodated in the rack 30, a sump 26 for supplying wash water to the spray nozzle 40, and a pump 28 configured to pump the wash water stored in the sump 26 to the spray nozzle 40, a supply pipe 50 connecting the pump 28 and the spray nozzle 40, and an air jet generator 100 disposed in a supply path formed by the supply pipe 50 to suck outside air into the washing water flowing in the supply pipe 50 and crush the washing water to thereby generate minute air bubbles.

In addition, the dishwasher 10 according to the present embodiment may further include a water supply module 60 for supplying water to the sump 26 or the spray module, a drain module 62 connected to the sump 26 to discharge wash water to the outside, a filter assembly 70 installed at the sump 26 to filter wash water, and a heater module 72 installed at the sump 26 to heat wash water.

The rack 30 may be provided within the tub 24 to accommodate an object to be washed, such as a dish. The dishwasher 10 according to the present embodiment includes at least one rack 30. The rack 30 according to the present embodiment includes a lower rack 32 disposed in a lower portion of the inside of the tub 24, and an upper rack 34 disposed above the lower rack 32.

The dishwasher 10 according to the present embodiment includes at least one spray nozzle 40. The dishwasher 10 according to the present embodiment includes a lower nozzle 42 disposed inside the tub 24 to wash a target object placed in the lower rack 32, an upper nozzle 44 for washing a target object placed in the upper rack 34, and a top nozzle 46 disposed at the highest portion of the tub 24 to spray wash water.

The supply pipe 50 according to the present embodiment connects the sump 26 and the spray nozzle 40. In the dishwasher 10 according to the present embodiment, the air jet generator 100 is placed in a supply flow path formed by the supply pipe 50. The supply pipe 50 according to the present embodiment supplies wash water including air bubbles to at least one spray nozzle 40.

The supply pipe 50 according to the present embodiment includes a first pipe 52 connecting the pump 28 and a distribution nozzle 48, and a second pipe 54 connecting the distribution nozzle 48 and the top nozzle 46 or the upper nozzle 44. The upper nozzle 44 according to the present embodiment is connected to the second pipe 54 through a second flow path connection pipe 59.

Referring to FIG. 1, the supply pipe 50 according to the present embodiment may further include a third pipe 58 connecting the distribution nozzle 48 and the lower nozzle 42. On the contrary, the third pipe 58 may be omitted as the lower nozzle 42 is installed to communicate with the distribution nozzle 48.

Wash water discharged from the sump 26 through the pump 28 is supplied to the distribution nozzle 48 along the first pipe 52, and some of the wash water supplied to the distribution nozzle 48 is supplied to the lower nozzle 42 and the rest of the wash water moves along the second pipe 54.

In the dishwasher 10 according to the present embodiment, the air jet generator 100 is disposed in a supply flow path formed by the second pipe 54.

The second pipe 54 may form a flat cross section so as to occupy an area as small as possible in the tub 24. Referring to FIG. 2, the second pipe 54 according to the second embodiment may have a cross section that is close to a flat rectangular shape.

The second pipe 54 according to the second embodiment includes a deformed connection portion 55 connected to the air jet generator 100. The cross section of the flow path of a deformation connector portion 55 is deformed into the same cross section of the flow path of the air jet generator 100. The cross section of the flow path of a deformed connection portion **55*a* at the upstream side of the air jet generator 100, where wash water is supplied to the air jet generator 100, is deformed from a rectangular shape into a circular shape. In addition, the cross section of the flow path of a deformed connection portion 55*b* at the downstream side of the air jet generator 100, where wash water is discharged from the air jet generator 100**, is deformed from a circular shape into a rectangular shape.

Part of wash water flowing along the second pipe 54 is supplied to the upper nozzle 44 through the second flow path connection pipe 59, and the rest of the was water flows to the top nozzle. Wash water sprayed through the upper nozzle 44 or the top nozzle may include air bubbles.

The upper nozzle 44 may be disposed above or below the upper rack 34. Referring to FIG. 1, the upper nozzle 44 is disposed below the upper rack 34. However, this is merely an example, and the upper nozzle 44 may be disposed above the upper rack 34. It is preferable that the upper nozzle 44 is rotatably coupled to the second flow path connection pipe 59 so as to be rotated by a reaction force occurring when the wash water is sprayed.

The top nozzle 46 is disposed at a position higher than the upper arm. The top nozzle 46 is disposed in an upper portion of the tub 24. The top nozzle 46 is supplied with wash water from the second pipe 54, and sprays the wash water toward the upper rack 34 and the lower rack 32.

In the present embodiment, the spray nozzle 40 is constructed to be supplied with wash water from the sump 26 for storing the wash water and spray the supplied wash water, but, unlike the present embodiment, the spray nozzle may be constructed to be supplied with water directly from the water supply module 60.

The waster supply module 60 is supplied water from the outside and supplies the water to the sump 26, and, in the present embodiment, the water is supplied to the sump 26 through a filter assembly 70. The drain module 62 is to discharge wash water stored in the sum 26 to the outside, and composed of a drain flow path 64 and a drain pump 66.

The filter assembly 70 is to filter out foreign matters such as food residue contained in the wash water, and disposed on a flow path of the wash water introduced from the tub 24 and the sump 26.

To this end, a filter mounting portion to which the filter assembly 70 is mounted may be formed in the sump 26, and a filter path connecting the filter mounting portion and the inside of the sump 26 may be provided.

The sump 26 include a storage for the sump 26 to store wash water, and the pump 28 for pumping the stored wash water to the spray module.

The pump 28 pumps the wash water stored in the sump 26 to the spray module. The pump 28 is connected to the spray module through a flow path for the pump 28.

The air jet generator 100 according to the present invention generates air bubbles in wash water that flows on a supply flow path formed by the supply pipe 50. The air jet generator 100 generates minute air bubbles in the wash water flowing along the supply pipe 50, by sucking and crushing outside air. The air jet generator 100 is disposed in a supply flow path formed by the second pipe 54. When the pump 28 is operated, the wash water in which the air bubbles is generated by the air jet generator 100 is sprayed to dishes through the spray module.

The sump 26 may be connected to a steam flow path and a steam nozzle, which spray steam generated by the heater module 72 to the inside of the tub 24, and a valve (not shown) connected to the steam nozzle may be installed in the steam flow path, and the steam to be sprayed to the tub 24 may be regulated through the valve, and the amount of steam to be sprayed may be adjusted upon occasions.

Here, the steam generated in the sump 26 may be supplied into the tub 24 through the filter flow path and the filter mounting portion, not through the steam nozzle. The sump 26 may be connected to the tub 24 in both directions through the steam flow path and the filter flow path.

Figure 3:
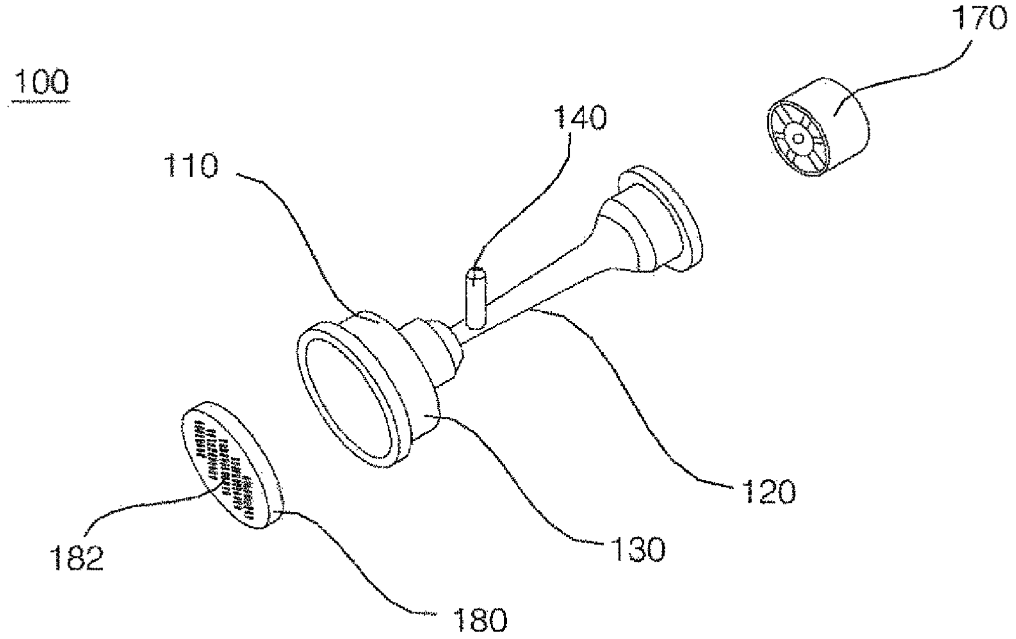
FIG. 3 is an exploded perspective view of an air jet generator according to an embodiment of the present invention.
Figure 4:
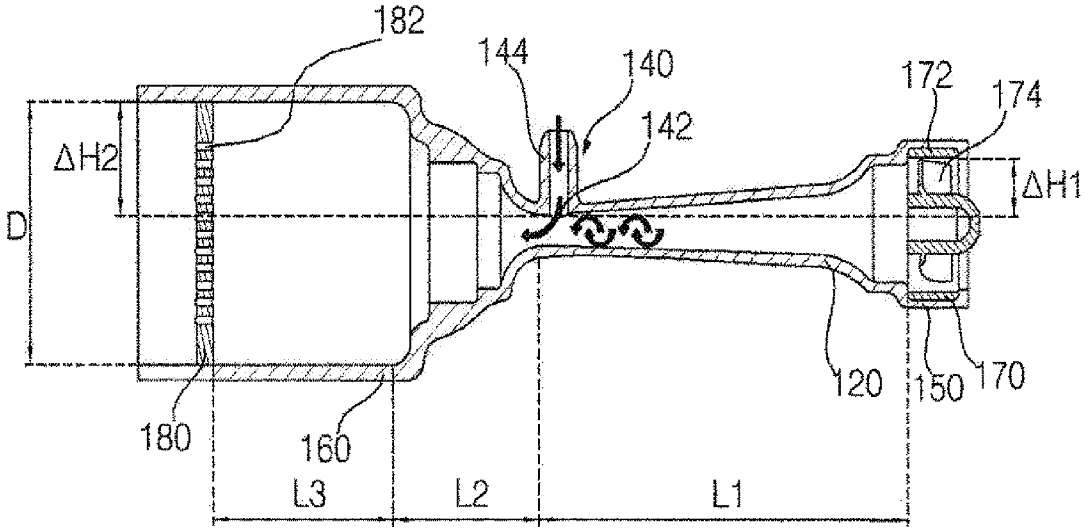
FIG. 4 is a cross-sectional view of an air jet generator according to an embodiment of the present invention.

FIG. 3 is an exploded perspective view of an air jet generator according to an embodiment of the present invention. FIG. 4 is a cross-sectional view of an air jet generator according to an embodiment of the present invention.

Referring to FIGS. 3 and 4, the air jet generator 100 according to an embodiment of the present invention will be described.

The air jet generator 100 according to the present embodiment includes: an impeller 170 for applying a centrifugal force to flowing wash water, a decompression portion 120 for reducing the pressure of the wash water having passed through the impeller 170, an air suction portion 140 for injecting air into the decompression portion 120, a pressing portion 130 for increasing a pressure to crush the air introduced from the air suction portion 140, and an air tap 180 having a plurality of holes 182 for crushing the air contained in the washing water having passed through the pressing portion 130.

The decompression portion 120 has a cross-sectional area of the flow path that is decreased in the traveling direction of the washing water, and the pressing portion 130 is formed in such a manner that the rate of increase in the cross-section of the flow path per flow path length is greater than the rate of decrease in the cross-section of the flow path per flow path length of the decompression portion 120, and the air suction portion 140 is disposed in a portion where the flow path area of the decompression portion 120 is decreased.

The decompression portion 120 and the pressing portion 130 form a single air crushing pipe 110. The air jet generator 100 is disposed in a supply flow path formed by the supply pipe 50 that connects the sump 26 and the spray nozzle 40.

Referring to FIG. 4, the impeller 170 is mounted on the impeller mounting portion 150 of the air crushing pipe 110 which will be described later on. The impeller 170 is disposed before the depression portion 120 of the air crushing pipe 110 in a direction in which wash water flows. Thus, the impeller 170 is not mounted on the impeller mounting portion 150 of the air crushing pipe 110, but may be disposed inside the second pipe 54 or between the decompression portion 120 and the second pipe 54.

The impeller 170 according to the present embodiment is mounted and fixed to the impeller mounting portion 150. The impeller 170 includes an impeller circumferential portion 172 forming an annular outer shape, and a vane 174 disposed inside the impeller circumferential portion 172 to apply a centrifugal force to the wash water. The impeller circumferential portion 172 abuts against the impeller mounting portion 150 and is fixed.

The washing water passing through the impeller 170 rotates as it passes through the vane 174 to generate a swirling flow. The vane 174 of the impeller 170 applies a centrifugal force to the wash water flowing to the decompression portion 120. The vane 174 of the impeller 170 may be fixed or rotated and applies a centrifugal force to the wash water passing through the impeller 170.

The air crushing pipe 110 includes the decompression portion 120 for decompressing the wash water and increasing the speed of the wash water and the pressing portion 130 for drastically increasing the cross-sectional area of the flow path, and the decompression portion 120 is provided with the air suction portion 140 which sucks air from a portion where the wash water is decompressed to form a negative pressure.

The air crushing pipe 110 further includes the impeller mounting portion 150 in which the impeller 170 is mounted, and an air tap mounting portion 160 in which the air tap 180 is mounted.

The air crushing pipe 110 is disposed in the order of the impeller mounting portion 150, the decompression portion 120, the pressing portion 130, and the air tap mounting portion 160 in the direction in which the wash water flows. The air suction portion 140 is formed at a portion where the flow path cross-sectional area of the decompression portion 120 is reduced. The air suction portion 140 forms a suction port 142 opened upward at a portion where the decompression of the decompression portion 120 is terminated.

The impeller mounting portion 150 is connected to the end of an inflow pipe, and the inner circumference of the impeller mounting portion 150 is formed to correspond to the outer circumference of the impeller circumferential portion 172 such that the impeller 170 is mounted and fixed to the impeller mounting portion 150.

The decompression portion 120 is disposed in the next position of the impeller mounting portion 150 of the air crushing pipe 110 in the direction in which the wash water flows. The decompression portion 120 is a part of the air crushing pipe 110 through which the wash water that passed through the impeller 170 flows. In the decompression portion 120, the cross sectional area of the flow path is decreased in the progress direction of the wash water. In the decompression portion 120, the cross sectional area of the flow path is decreased in the progress direction of the wash water such that the pressure of the wash water flowing through the decompression portion 120 is decreased and the speed is increased.

In the decompression portion 120, the cross section of the flow path is gradually decreased in the progress direction of the washing water. The decompression portion 120 forms the air suction portion 140 at a portion where decompression is terminated. The air suction portion 140 is formed at a portion where the flow path cross-section of the decompression portion 120 is decreased.

The air suction portion 140 forms the suction port 142 opened from one side of the decompression portion 120. The air suction portion 140 includes an air suction pipe 144 protruding from one side of the decompression portion 120 to form a flow path through which air is sucked therein. The air suction pipe 144 is connected to a connection pipe (not shown). The connection pipe is connected to the outside of the dishwasher 10 or to the inside of the tub 24. The connection pipe is coupled to the air suction pipe 144 in a fusing method.

The air suction pipe 144 may be integrally formed with the tub connection pipe and directly connected to the outside of the dishwasher 10 or to the tub 24, and the air suction pipe 144 alone may be formed with the connection pipe omitted.

In the decompression portion 120, the area of the flow path is decreased toward the progress direction of the wash water such that the pressure of the washing water is lowered, and a negative pressure lower than the atmospheric pressure is formed at a portion where the suction port 42 of the air suction portion 140 is formed such that the outside air is sucked in by itself. The air sucked into the air crushing pipe 110 is primarily crushed by the speed and the swirling force of the wash water flowing inside the decompression portion 120.

The wash water containing the primarily crushed air flows to the pressing portion 130.

The pressing portion 130 is disposed in the next part of the decompression portion 120 of the air crushing pipe 110 in the direction in which the wash water flows. The pressing portion 130 receives the wash water having passed through the decompression portion 120.

The pressing portion 130 increases the pressure to such an extent that the air introduced from the air suction portion 140 is crushed. In the pressing portion 130, the cross-sectional area of the flow path is rapidly increased in the direction in which the wash water flows so that the air contained in the washing water can be crushed. The increasing ratio ($\Delta H2/L2$) of the radius of the flow path cross section per flow path length of the pressing portion 130 is larger than the decreasing ratio ($\Delta H1/L1$) of the radius of the flow path cross section per flow path length of the decompression portion 120.

The flow path cross-sectional area of a discharge end portion of the pressing portion 130 is formed wider than the flow path cross-sectional area of an inflow end portion of the decompression portion 120. The pressing portion 130 expands larger than the flow path cross-section of the inflow pipe so that the air crushing through a pressure difference occurs effectively.

As the cross-sectional area of the flow path rapidly increases, the speed of the wash water decreases, and the pressure rapidly increases. Due to a sudden increase in pressure, the air in the washing water is secondarily crushed.

In the direction in which the washing water flows, a side end surface of the flow path of the pressing portion 130 increases like a curved line of a quadratic function, and then, is bent in a stepped shape and a side end surface of the flow path is widened. Since the cross section of the flow path of the pressing portion 130 is gradually expanded in a narrow section, air crushing in the washing water through the pressure difference effectively proceeds.

The air tap mounting portion 160 is disposed in the next position of the pressing portion 130 of the air crushing pipe 110 in the direction in which the wash water flows. The air tap mounting portion 160 maintains a constant flow path extended from the pressing portion 130, and the air tap 180 is mounted inside the air tap mounting portion.

The air tap 180 is mounted in the air tap mounting portion 160 of the air crushing pipe 110. The air tap 180 is fixed to the air tap mounting portion 160. The air tap 180 is disposed at a position spaced apart from the pressing portion 130 by a predetermined distance.

The air tap 180 has a disk shape, and is provided with a plurality of holes 182 penetrating the inside thereof. The wash water having passed through the pressing portion 130 passes through the air tap 180. The air in the wash water is thirdly crushed while passing through the plurality of holes 182 formed in the air tap 180.

The holes 182 formed in the air tab 180 are disposed closely to the disk-shaped air tab 180 at predetermined intervals. The air tap 180 may be an air tap **180*a* having a hollowed type hole or may be an air tap 180 having a slot type hole elongated in the left and right direction. In addition, it may be an air tap 180*c*** having a cross slot type hole in which an elliptical shape elongated in the vertical direction and an elliptical shape elongated in the left and right direction are combined.

In the hole 182 formed in the air tap 180, as the contact area with the air bubble increases, the shearing force acting on the air bubble increases to increase the amount of generated air bubbles, and thus, the slot type hole is preferable to the hollowed type hole.

As the washing water passes through the pressing portion 130, the sucked air is secondarily crushed. When the air tab 180 is spaced from the pressing portion 130 at predetermined intervals, the sucked air is sufficiently secondarily crushed through the pressing portion 130 and then passes through the air tap 180 again, thereby increasing the amount of generated air bubbles. Therefore, it is preferable that a distance L3 of the air tap 180 spaced from the pressing portion 130 maintains a distance of the diameter size D or more of the cross section of the air tap so as to maximize the amount of generated air bubbles.

Figure 5:
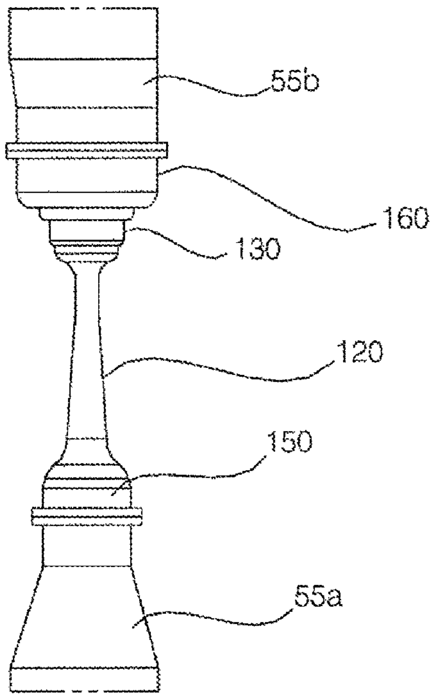
FIG. 5 is a diagram for explaining a state in which an air jet generator and a supply pipe are connected according to the present embodiment.
Figure 6:
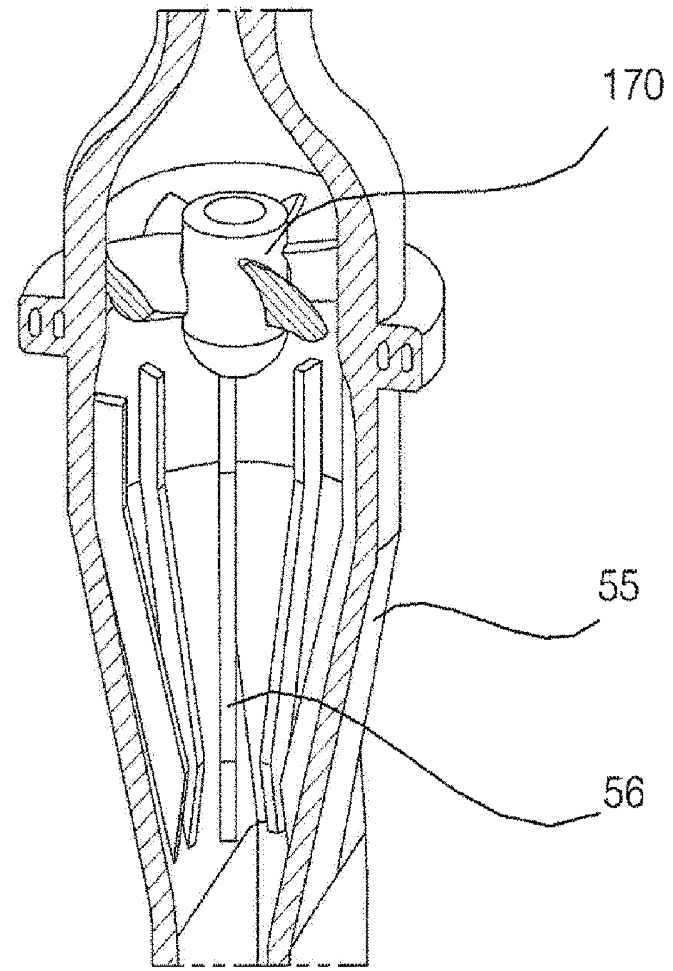
FIG. 6 is a diagram for explaining a deformed connection portion in which guide vanes are disposed according to an embodiment of the present invention.
Figure 7:
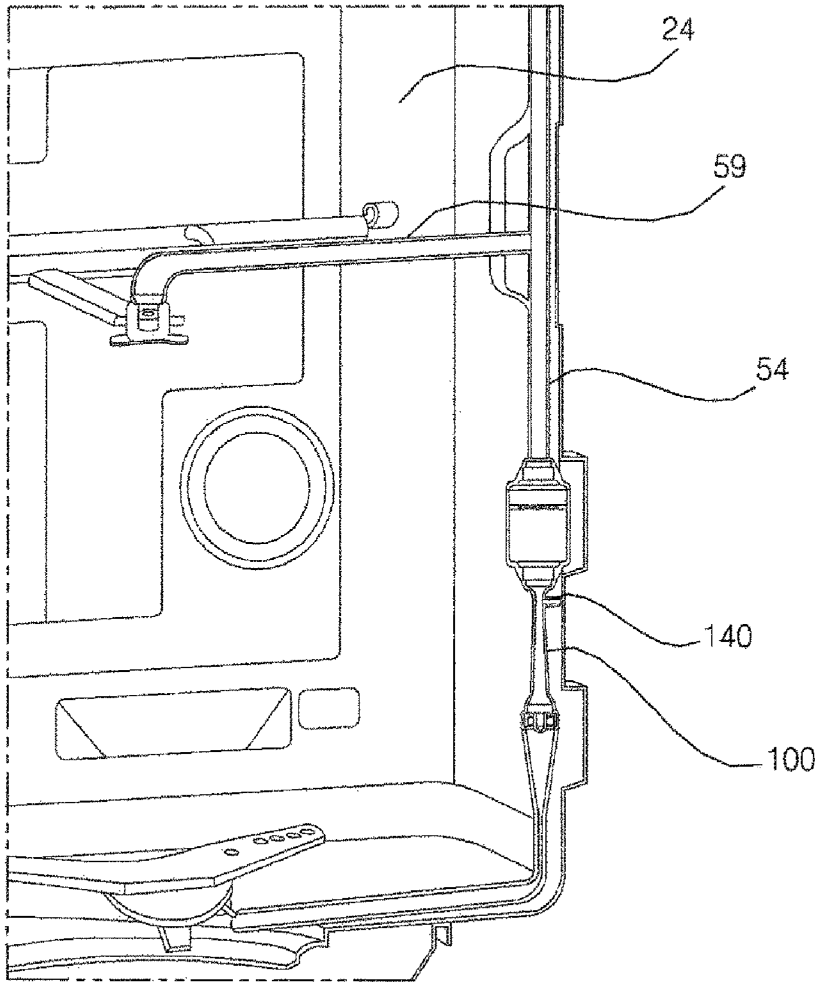
FIG. 7 is a diagram for explaining arrangement of an air jet generator according to an embodiment of the present invention.
Figure 8:
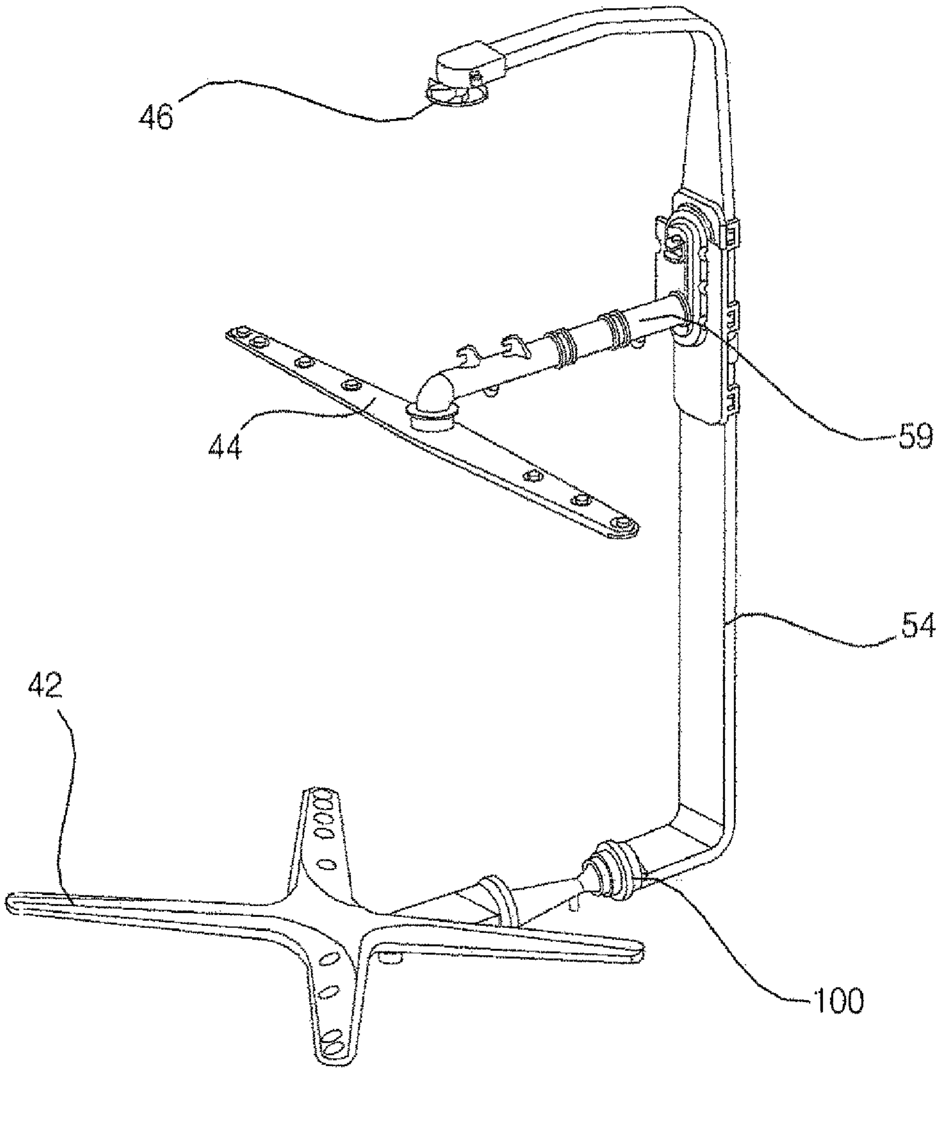
FIG. 8 is a diagram illustrating a supply pipe including an air jet generator according to another embodiment of the present invention.

FIG. 5 is a diagram for explaining a state in which an air jet generator and a supply pipe are connected according to the present embodiment. FIG. 6 is a diagram for explaining a deformed connection portion in which guide vanes are disposed according to an embodiment of the present invention. FIG. 7 is a diagram for explaining arrangement of an air jet generator according to an embodiment of the present invention. FIG. 8 is a diagram illustrating a supply pipe including an air jet generator according to another embodiment of the present invention.

Hereinafter, arrangement of the air jet generator and the shape of the supply pipe connected to the air jet generator will be described.

It is preferable that the cross section of the air crushing pipe 110 is formed in a circular shape, so that the air jet generator 100 crushes air by decreasing pressure of the air while generating a swirling flow in flowing wash water, and increases the pressure again to generate a large amount of air bubbles.

The cross section of the supply pipe 50 of the dishwasher 10 according to the present embodiment is formed in a flat shape to utilize a relatively small space in the tub 24. The cross section of the second pipe 54 formed along the bottom surface and a side surface of the tub 24 is formed in a flat shape.

At a portion connected to the air jet generator 100, the cross section of the flow path of the supply pipe 50 is deformed into a circular shape and coupled to the air jet generator 100. At a portion connected to the air jet generator 100, the second pipe 54 according to the present embodiment includes the deformed connection portion 55 in which the cross section of the flow path is deformed into the circular shape.

Guide vanes 56 are installed in the supply pipe 50 that is connected to the air jet generator 100. The guide vanes 56 are installed in the deformed connection portion 55. The guide vane 56 is formed in a length direction within the supply pipe 50 in which the wash water flows. The guide vanes 56 allow wash water to uniformly flow in the supply pipe 50 of which the cross section of the flow path is deformed.

Referring to FIG. 7, the air jet generator 100 according to the present embodiment is disposed in a supply flow path formed by the second pipe 54 that connects the distribution nozzle 48 and the upper nozzle 44 or the top nozzle 46. The air jet generator 100 is formed at a portion of the second pipe 54 which is formed along a side surface of the tub 24. The air suctioning pipe 144 of the air jet generator 100 forms the suction port 142 opened outward of the tub 24.

Referring to FIG. 8, an air jet generator 100 according to another embodiment of the present invention is disposed at a portion of a second pipe 54 which is formed along a bottom surface of the tub 24. The air suctioning pipe 144 of the air jet generator 100 forms the suction port 142 opened outward of the tub 24. However, this is merely an example, and a suction port 142 opened inward of the tub 24 may be formed.

What is claimed is:

1. A dishwasher comprising:

a tub that defines a washing space;

a sump disposed below the tub and configured to receive washing water;

a spray nozzle disposed in the tub and configured to spray the washing water into the washing space, the spray nozzle comprising:

an upper nozzle comprising a plurality of upper arms that define upper nozzle holes, and a lower nozzle disposed below the upper nozzle, the lower nozzle comprising a plurality of lower arms that define lower nozzle holes;

a pump configured to supply the washing water from the sump to the spray nozzle;

a supply pipe that connects the pump to the spray nozzle; and an air jet generator configured to generate air bubbles in the washing water flowing along the supply pipe, wherein the supply pipe is configured to supply the air bubbles to the washing space through the upper nozzle holes or the lower nozzle holes, wherein the supply pipe comprises a first expansion portion connected to the air jet generator, and wherein the air jet generator comprises:

a contraction portion configured to decrease pressure of the washing water flowing in the air jet generator, an air suction portion opened to an outside of the air jet generator and configured to introduce air into the contraction portion, and a second expansion portion configured to increase the pressure of the washing water flowing in the air jet generator to thereby crush the air introduced from the air suction portion.

2. The dishwasher of claim 1, wherein the lower nozzle includes at least four lower arms that define the lower nozzle holes.

3. The dishwasher of claim 1, wherein the supply pipe defines a first flow path cross-section having a rectangular shape, and wherein the air jet generator defines a second flow path cross-section having a circular shape.

4. The dishwasher of claim 1, wherein a cross section of a flow path defined by the first expansion portion is identical to a cross section of a flow path defined by the air jet generator.

5. The dishwasher of claim 4, wherein the supply pipe comprises a plurality of guide vanes that are disposed within the first expansion portion and that extend in a length direction of the supply pipe.

6. The dishwasher of claim 5, wherein the plurality of guide vanes are spaced apart from one another in a circumferential direction of the first expansion portion and protrude from an inner circumferential surface of the first expansion portion.

7. The dishwasher of claim 6, wherein a distance between the plurality of guide vanes in the circumferential direction increases in the length direction of the supply pipe.

8. The dishwasher of claim 1, wherein the supply pipe comprises:

a first portion that defines a first flow path having a rectangular cross-section; and a second portion that connects the first portion to the air jet generator, the second portion defining a second flow path having a circular cross-section that is identical to a cross section of a flow path defined by the air jet generator.

9. The dishwasher of claim 1, wherein the air jet generator further comprises:

an air tap that defines a plurality of holes configured to crush the air in the washing water having passed the second expansion portion.

10. The dishwasher of claim 9, wherein an outer circumferential surface of the air tap is in contact with an inner circumferential surface of the second expansion portion.

11. The dishwasher of claim 9, wherein the contraction portion extends to the air suction portion in a longitudinal direction of the air jet generator, and wherein an inner diameter of the contraction portion decreases along the longitudinal direction.

12. The dishwasher of claim 11, wherein the second expansion portion extends from the air suction portion in the longitudinal direction, and wherein an inner diameter of the second expansion portion increases along the longitudinal direction.

13. The dishwasher of claim 9, further comprising an impeller configured to apply centrifugal force to the washing water flowing into the contraction portion.

14. The dishwasher of claim 13, wherein the impeller is disposed inside of the air jet generator or the supply pipe.

15. The dishwasher of claim 14, wherein the supply pipe comprises a plurality of guide vanes that are disposed inside of the supply pipe, that extend in a length direction of the supply pipe, and that are disposed upstream relative to the impeller.

16. The dishwasher of claim 13, wherein the air jet generator is configured to guide the washing water from the contraction portion toward the second expansion portion through the air suction portion.

17. The dishwasher of claim 1, wherein the air jet generator is disposed at a supply passage defined by the supply pipe.

18. The dishwasher of claim 1, further comprising a distribution nozzle configured to receive the washing water from the pump and to supply the washing water to the upper nozzle or the lower nozzle, and wherein the supply pipe comprises a first pipe that connects the pump to the distribution nozzle and a second pipe that connects the distribution nozzle to the upper nozzle.

19. The dishwasher of claim 18, wherein the air jet generator is disposed at the second pipe.

20. The dishwasher of claim 19, wherein the supply pipe further comprises a third pipe that extends in a vertical direction and that connects the pump to the lower nozzle.

* * * * *